US011345322B2

(12) United States Patent
Busse

(10) Patent No.: US 11,345,322 B2
(45) Date of Patent: May 31, 2022

(54) METHOD FOR OPERATING AN CONTROL DEVICE FOR A BRAKING SYSTEM OF A MOTOR VEHICLE, CONTROL DEVICE AND MOTOR VEHICLE

(71) Applicant: Volkswagen Aktiengesellschaft, Wolfsburg (DE)

(72) Inventor: Oliver Busse, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 358 days.

(21) Appl. No.: 16/492,297

(22) PCT Filed: Mar. 19, 2018

(86) PCT No.: PCT/EP2018/056836
§ 371 (c)(1),
(2) Date: Sep. 9, 2019

(87) PCT Pub. No.: WO2018/177786
PCT Pub. Date: Oct. 4, 2018

(65) Prior Publication Data
US 2020/0010059 A1 Jan. 9, 2020

(30) Foreign Application Priority Data
Mar. 28, 2017 (DE) .................... 10 2017 205 206.6

(51) Int. Cl.
*B60T 7/12* (2006.01)
*B60T 8/1755* (2006.01)
(Continued)

(52) U.S. Cl.
CPC ............ *B60T 7/12* (2013.01); *B60T 8/17555* (2013.01); *B60T 8/321* (2013.01); *B60T 13/662* (2013.01);
(Continued)

(58) Field of Classification Search
CPC ..... B60T 7/00; B60T 7/12; B60T 8/00; B60T 8/17; B60T 8/1755; B60T 8/17555;
(Continued)

(56) References Cited

U.S. PATENT DOCUMENTS 6,030,055 A 2/2000 Schubert .................... 303/113.4
6,208,926 B1 3/2001 Wagner et al. ................. 701/70
(Continued)

FOREIGN PATENT DOCUMENTS

CN 1647981 A 8/2005 ............. B60K 31/00
CN 1706699 A 12/2005 ............... B60T 8/58
(Continued)

OTHER PUBLICATIONS

International Search Report and Written Opinion, Application No. PCT/EP2018/056836, 26 pages, dated Jun. 7, 2018.
(Continued)

*Primary Examiner* — Sze-Hon Kong
*Assistant Examiner* — Michael Allen Brace, Jr.
(74) *Attorney, Agent, or Firm* — Slayden Grubert Beard PLLC

(57) ABSTRACT

The invention relates to a method for operating a control device for a braking system of a motor vehicle, wherein the control device receives a braking request from a driver assistance system and determines a target value of a braking operation parameter of the braking system and determines an ideal temporal process for the braking operation parameter, which gradually leads to the target value, complying with a predetermined jerk criterion, and a determines a control fault of an actual value of the braking operation parameter in relation to the ideal process and determines a request value for a controller of a brake pressure pump of the braking system from the control fault on the basis of a controller unit. According to the invention, the control
(Continued)

device determines a maximum achievable temporal gradient of the braking operation parameter by means of the brake pressure pump and examines whether the gradient fulfills a freezing criterion and, in the case of the freezing criterion being fulfilled, limits at least one control operation parameter of the controller unit and/or a gradient of the brake request.

13 Claims, 3 Drawing Sheets

(51) Int. Cl.
    *B60T 8/32*           (2006.01)
    *B60T 13/66*         (2006.01)
    *G05B 11/42*         (2006.01)

(52) U.S. Cl.
    CPC ........... *G05B 11/42* (2013.01); *B60T 2201/02* (2013.01); *B60T 2201/10* (2013.01); *B60T 2250/00* (2013.01); *B60T 2260/09* (2013.01)

(58) Field of Classification Search
    CPC . B60T 8/32; B60T 8/321; B60T 13/00; B60T 13/02; B60T 13/66; B60T 13/662; B60T 2201/00; B60T 2201/02; B60T 2201/10; B60T 2250/00; B60T 2260/00; B60T 2260/09; G05B 11/00; G05B 11/01; G05B 11/36; G05B 11/42
    See application file for complete search history.

(56) References Cited

U.S. PATENT DOCUMENTS

| | | | |
|---|---|---|---|
| 7,321,819 B2 | 1/2008 | Seki | 701/96 |
| 2008/0224533 A1 | 9/2008 | Nakada et al. | 303/10 |
| 2009/0048751 A1 | 2/2009 | Nakai et al. | 701/70 |
| 2011/0166762 A1* | 7/2011 | Bunk | B60T 8/1755 701/70 |
| 2012/0279814 A1* | 11/2012 | Liebfried | B60T 8/1755 188/110 |
| 2018/0265068 A1* | 9/2018 | Heil | B60T 8/172 |

FOREIGN PATENT DOCUMENTS

| | | | |
|---|---|---|---|
| CN | 101264759 A | 9/2008 | B60T 8/00 |
| DE | 4100064 A1 | 7/1991 | G05B 5/01 |
| DE | 10021135 A1 | 10/2001 | B60T 13/66 |
| DE | 102005005375 A1 | 8/2006 | B60K 26/00 |
| DE | 19616732 B4 | 2/2007 | B60T 13/66 |
| DE | 102006022806 A1 | 11/2007 | B60T 8/17 |
| DE | 102009008941 A1 | 8/2010 | B60T 13/74 |
| DE | 102009030165 A1 | 9/2010 | G05B 11/40 |
| DE | 19707960 B4 | 2/2011 | B60T 13/68 |
| DE | 102015007164 A1 | 12/2016 | B60W 10/04 |
| DE | 102015218166 A1 | 3/2017 | B60T 7/12 |
| DE | 102016111065 A1 | 12/2017 | F02D 9/10 |
| DE | 102017205206 A1 | 10/2018 | B60T 8/172 |
| EP | 0204483 B1 | 1/1990 | B06L 7/00 |
| JP | 2005092267 A | 4/2005 | G05B 11/36 |
| WO | 92/05986 A2 | 4/1992 | B60T 8/172 |
| WO | 2018/177786 A1 | 10/2018 | B60T 13/66 |

OTHER PUBLICATIONS

Chinese Office Action, Application No. 201880017629.3, 9 pages, dated Jan. 27, 2021.

German Office Action, Application No. 102017205206.6, 7 pages, dated Jul. 6, 2020.

* cited by examiner

METHOD FOR OPERATING AN CONTROL DEVICE FOR A BRAKING SYSTEM OF A MOTOR VEHICLE, CONTROL DEVICE AND MOTOR VEHICLE

CROSS-REFERENCE TO RELATED APPLICATIONS

This application claims priority to German Patent Application No. DE 10 2017 205 206.6, filed on Mar. 28, 2017 with the German Patent and Trademark Office. The contents of the aforesaid patent application are incorporated herein for all purposes.

TECHNICAL FIELD

The invention relates to a method for controlling a braking system of a motor vehicle by means of an control device. By means of the method, brakes of the motor vehicle are actuated or activated as a function of a braking request of a driver assistance system. The invention also relates to the control device and a motor vehicle comprising the control device according to the invention.

BACKGROUND

A driver assistance system of a vehicle can reduce the burden on the driver during the task of driving, i.e., it can carry out longitudinal guidance (acceleration and braking) and/or transverse guidance (steering) without the help of the driver, for example. An example of a driver assistance system of this kind is adaptive cruise control (ACC). Another example of a driver assistance system involving requests to the longitudinal control system is a parking assistant. For this, a driver assistance system itself does not intervene in the braking system in order to implement or control a required negative acceleration (braking).

In order to implement a braking request (i.e., for negative acceleration for braking), a cascaded assembly of closed-loop controllers is provided instead, the closed-loop kinematic controller of the driver assistance system (outer cascade) outputting or emitting the braking request thereof relating to the vehicle movement to one or two closed-loop dynamic controllers (inner cascade), which then convert the prescribed target acceleration, i.e., the requested acceleration value of the braking request, into a corresponding value for a braking moment, braking force or braking pressure, for example, and then control the actual braking system on the basis of this value.

The parameters described here, i.e., braking moment, braking force and braking pressure, can be used interchangeably, for which reason they are collectively referred to in the following as the operating parameter of the braking procedure or braking operation parameter for short.

The closed-loop dynamic controller of the inner cascade therefore supplies the braking request received from the driver assistance system to the actuators available to said closed-loop dynamic controller, the conversion of the braking request into the request value being carried out to that end for the braking operation parameter, i.e., the braking moment, for example. A brake pressure pump of the braking system of the motor vehicle is provided as the actuator. The closed-loop dynamic controller in turn controls said brake pressure pump indirectly by prescribing a desired value or request value for a closed-loop controller of the brake pressure pump.

Said cascaded closed-loop control system or closed-loop control chain therefore results in the following procedure for setting a braking operation parameter in a braking system as a function of a braking request of the driver assistance system:

The closed-loop dynamic controller is located between the driver assistance system and the braking system. A closed-loop dynamic controller of this kind can be provided by means of a closed-loop controller apparatus of a control device of the motor vehicle. The method discussed herein relates to said control device. The control device receives the braking request, i.e., an acceleration value, for example $-1$ m/s$^2$, from the driver assistance system, for example an adaptive cruise control system. A stationary target value of a braking operation parameter of the braking system, i.e., the braking moment, for example, is then determined for said braking request. The target value indicates the value of the braking operation parameter that results in the requested braking acceleration.

However, the target value cannot be set immediately, since this would lead to an abrupt change in the braking operation parameter, i.e., for example, an abrupt or stepped increase in the braking moment to $-1$ m/s$^2$, for example. This should be prevented or avoided for vehicle passengers, since this change would also cause a stepped increase in the acceleration of the motor vehicle (in this case negative acceleration). Instead, a gradual increase or gradual change in the acceleration of the motor vehicle is desirable. The derivative of the acceleration is referred to as a jerk. Mathematically, said jerk should therefore always progress in a differentiable manner. In some embodiments, the value of the jerk is constant. In other words, the jerk should generally meet a prescribed boundary condition referred to here as the jerk criterion. The target value is therefore the value which should be set gradually within a predetermined time frame, e.g., within two seconds or, as a general rule, another value of less than five seconds, for example.

If the control device then receives the braking request having the negative acceleration value from the driver assistance system, said jerk criterion additionally applies. Therefore, a change in the braking operation parameter, for example, must be produced in such a way that the acceleration of the motor vehicle changes in a constant manner. In order to reach the target value, an ideal temporal course that gradually leads to the target value in compliance with the jerk condition is therefore initially determined. The ideal course may for example begin at an initial value of 0, since the brake is not initially active upon reception of the braking request. The closed-loop controller unit, by means of the closed-loop dynamic controller thereof, then sets a desired value for the downstream closed-loop controller of the brake pressure pump of the braking system, more specifically sets a variable desired value, which is also referred to here as the request value and which ideally varies with time in accordance with the ideal course, i.e., gradually increases until the target value is reached and thereby fulfills the jerk criterion, as opposed to directly setting the target value of the braking operation parameter. Therefore, by means of the request value, the brake pressure pump is notified which braking pressure the braking system should set or generate in order to generate or set the braking operation parameter.

However, the request value is not set exactly in accordance with the ideal course. That is to say that a control error of an actual value of the braking operation parameter, i.e., of the braking moment, for example, in relation to the ideal course is determined and then the request value is adjusted by means of the closed-loop dynamic controller depending on the control error and this adjusted request value is set in the closed-loop controller of the brake pressure pump of the braking system.

The specification or adjustment of the braking operation parameter in this way by means of the closed-loop dynamic controller and downstream closed-loop controller of the brake pressure pump can present a problem in that the braking system may have dynamics that depend on the current braking pressure, and therefore the maximum temporal gradient that can be reached by means of the braking system when the braking operation parameter is set may vary. Said gradient may in particular be smaller than the dynamics of the closed-loop dynamic controller itself. As a result, the closed-loop dynamic controller establishes a control error that keeps increasing with time because the braking system cannot reduce the control error fast enough on account of its lower level of dynamics. Said increase of the control error without it being possible for the braking system to reduce or decrease the control error by setting a sufficient temporal gradient is referred to as windup.

In order to prevent this kind of windup, it is known from DE 196 16 732 B4 to only adjust the integral component in a closed-loop deceleration controller if an actual value to be adjusted has almost reached a desired value. However, if the actual value is still far from the desired value, the integral component is not adjusted, but rather is set to 0. Solely taking into consideration a difference between the actual value and the desired value has the disadvantage that a potential of the braking system, i.e., the maximum achievable temporal gradient that can be set by means of the brake pressure pump of the braking system, is not utilized under certain circumstances. It may therefore be expedient to also use or adjust the integral component in the case of a large difference if the braking system has sufficient dynamics in order to be able to compensate the control error at the current point in operation.

SUMMARY

An object thus exists to prevent windup in the above-described closed-loop control chain and at the same time exploit the greatest possible system dynamics.

This object is solved by the subject matter of the independent claims. Embodiments are described in the dependent claims, the following description, and the figures.

In one aspect, a method for operating a control device for a braking system of a motor vehicle is provided. According to the method, the control device receives a braking request from a driver assistance system; determines a target value of a braking operation parameter of the braking system for said braking request; determines an ideal temporal course for said braking operation parameter, which ideal temporal course gradually leads to the target value in compliance with a predetermined jerk condition; determines a control error of an actual value of the braking operation parameter in relation to the ideal course and determining a request value for a closed-loop controller of a brake pressure pump of the braking system from said control error on the basis of a closed-loop controller unit; and sets the request value in the closed-loop controller.

According to the method, the control device determines a maximum achievable temporal gradient of the braking operation parameter using the brake pressure pump and checks, whether the gradient fulfills a predetermined freezing criterion, and, if the freezing criterion is fulfilled, limits at least one control operation parameter of the closed-loop controller unit and/or a gradient of the braking request to a respectively prescribed maximum value.

BRIEF DESCRIPTION OF THE DRAWINGS

Figure 1:
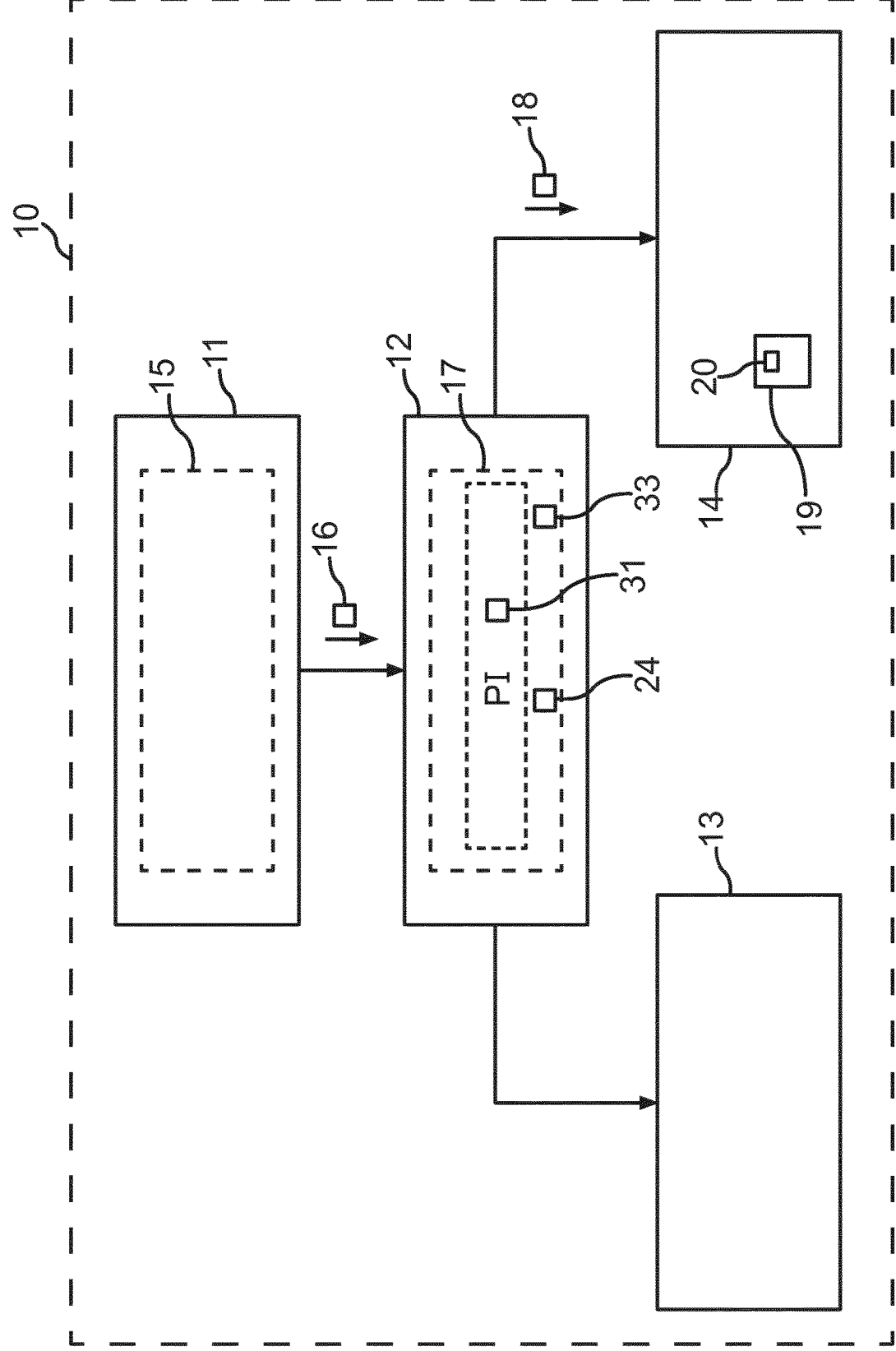
Figure 2:
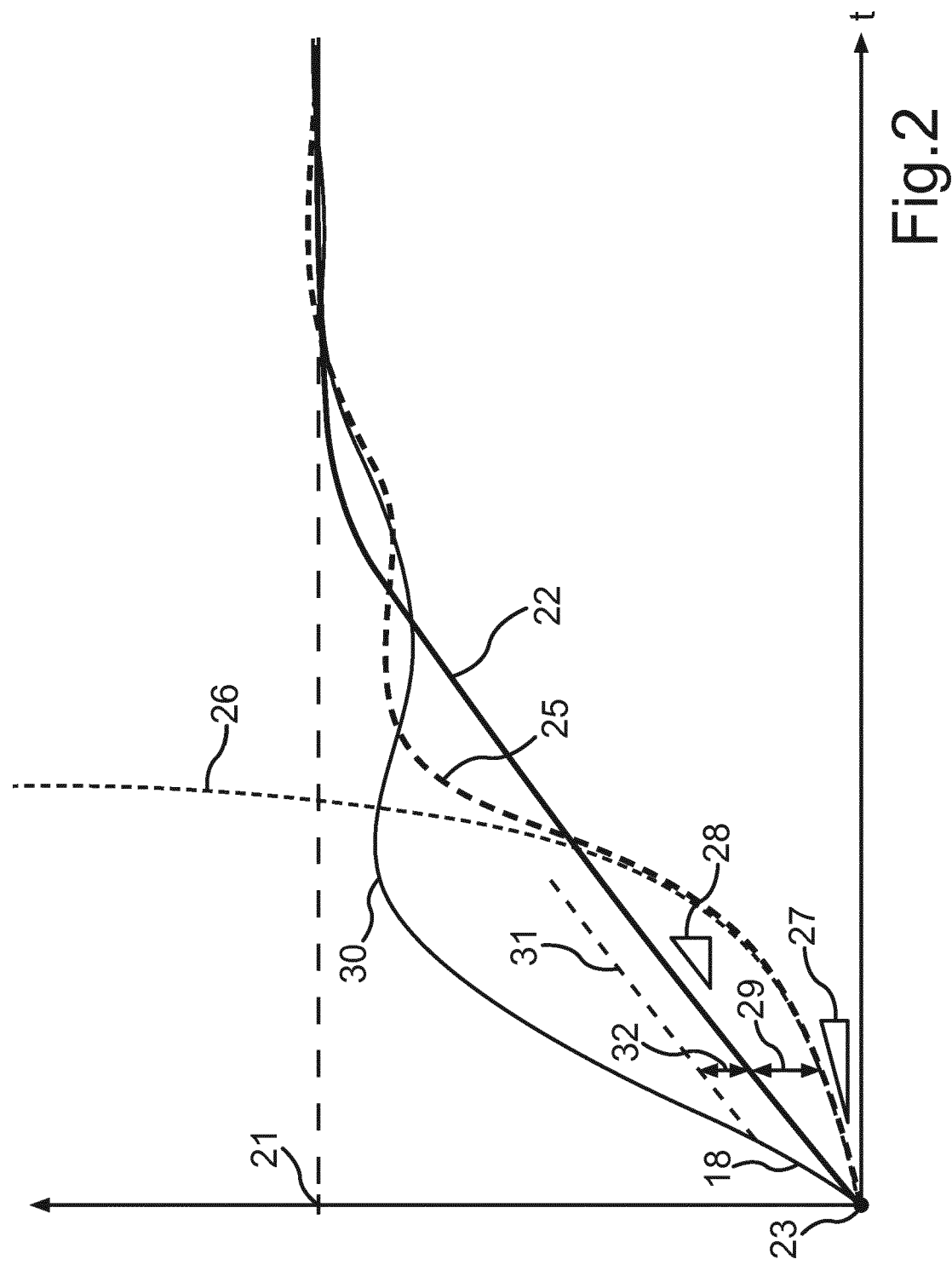
Figure 3:
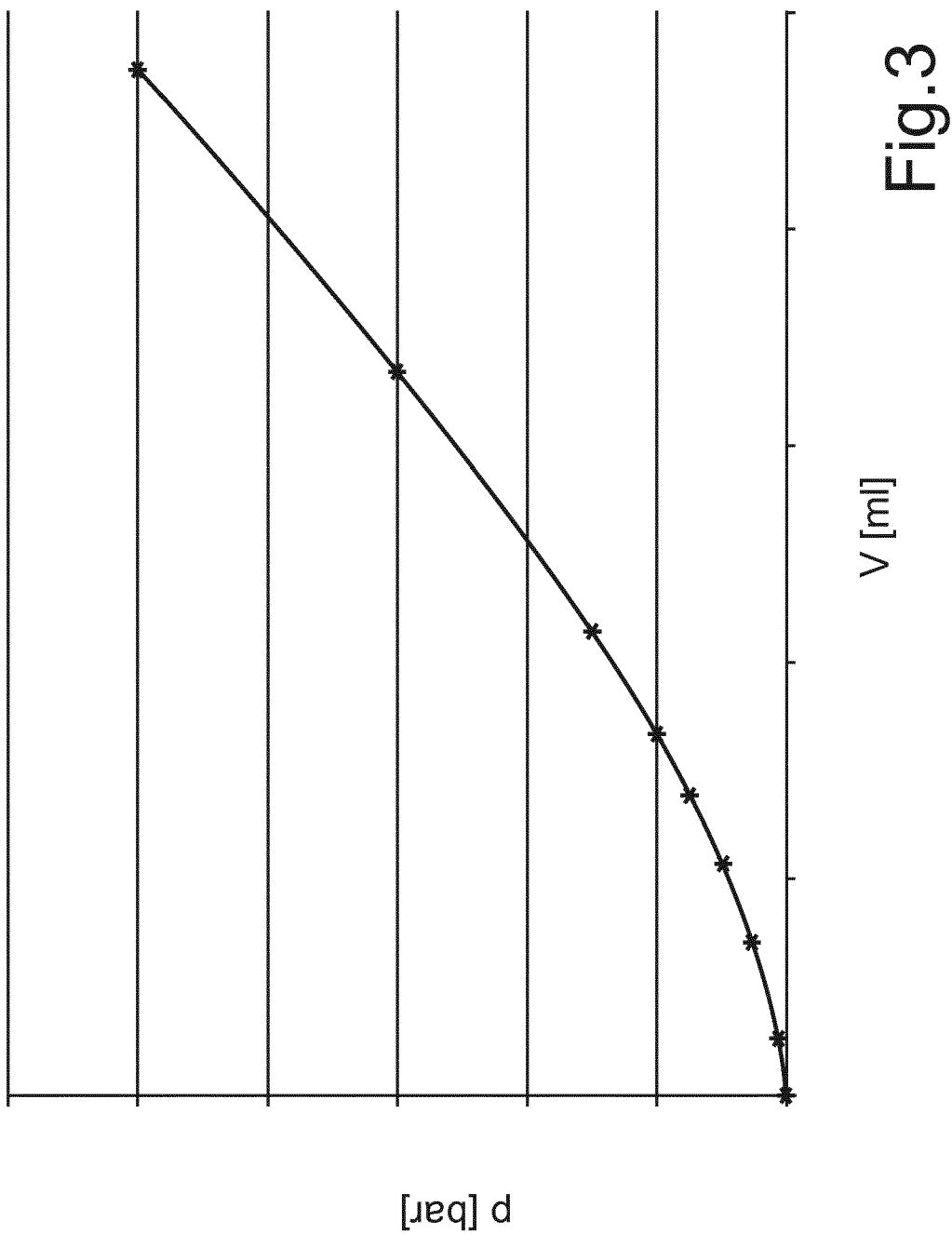

IN THE FIGS.:

FIG. 1 shows a schematic representation of an embodiment of a motor vehicle;

FIG. 2 shows a diagram showing schematized signal curves as they may vary with time t during operation of the motor vehicle from FIG. 1 on the basis of an embodiment of a method for operating a control device for a braking system; and FIG. 3 shows a diagram showing a schematized curve representing a dependence of the braking pressure and the conveyed brake fluid volume of the braking system.

DETAILED DESCRIPTION

In one exemplary aspect, a method for operating a control device for a braking system provides for a maximum or highest possible temporal gradient of the braking operation parameter that can be achieved by means of the brake pressure pump and that depends on the current point in operation, i.e., a temporal gradient of the braking moment, for example, to be determined. Accordingly, a braking force, a braking moment or a braking pressure, or an equivalent request that is proportional to the braking moment at least in the first approximation, may be produced in the motor vehicle for the braking or deceleration event. In general, this refers to the previously mentioned braking operation parameter.

Therefore, during approach to the target value of the braking operation parameter in the control device, it is known which maximum or highest possible temporal change of the braking operation parameter can currently or presently be achieved. Limiting the brake pressure pump can for example be justified in that a rotational speed of the brake pressure pump is limited in order to keep an emission of noise below a threshold value. For example, it is known from DE 10 2009 008 941 A1 to limit pressure modulation in a braking system to a lower level of dynamics than the maximum possible dynamics in order to prevent noise.

The control device then, e.g., checks whether the gradient fulfills a predetermined freezing criterion. A freezing criterion should be understood to mean that a change in an operating parameter of the closed-loop controller unit (e.g., said integral component) is prevented or interrupted or deactivated, i.e., the current value of said control operation parameter is frozen or maintained or at least limited. If the freezing criterion is fulfilled, at least one control operation parameter of the closed-loop controller unit is limited to a respectively prescribed maximum value. Therefore, freezing does not provide that the value of the control operation parameter is kept constant, but rather it is stopped from becoming larger than the maximum value. However, the control operation parameter may become smaller, such that the closed-loop controller unit can for example only consider an additional, external braking effect, such as rolling up a slope, for example.

The maximum value may in some embodiments be greater than zero in order to ensure that the braking operation parameter changes. If the freezing criterion is met, additionally or alternatively, a gradient of the braking request itself, i.e., the input parameter, can be limited.

A benefit of the present aspect is that the control device configures or sets the closed-loop controller unit thereof and, more specifically, depending on the current capacity or potential of the brake pressure pump with regard to the maximum achievable temporal gradient of the braking operation parameter at the current point in operation, which may be defined by a current pressure that has already built up, for example.

The closed-loop controller unit may comprise a PI controller as the closed-loop dynamic controller. Generally speaking, the closed-loop controller unit comprises a closed-loop controller having an I component (integral component) and the control operation parameter affected or controlled by the freezing criterion is said I component. It is therefore the I component that is limited. This produces the benefit that the I component is kept smaller than the maximum value, which, however, is beneficially greater than zero, which will be explained in greater detail below.

Limiting the I component provides the benefit that the inertia or the component limiting the dynamics of the closed-loop controller is kept smaller than the maximum value such that the closed-loop controller unit can carry out corrections within a specifiable maximum time frame when the request value is reached or in the event of overshoot on account of the limited I component.

If the freezing criterion has not been fulfilled or has been violated, i.e., the dynamics of the brake pressure pump are sufficiently great and in some embodiments, the at least one control operation parameter, i.e., in particular the I component, as a function of the control error, is set to be greater than the maximum value related to the freezing criterion. This provides the benefit that the control error can be reduced with the available potential, i.e., the maximum achievable temporal gradient, expressed as a value, of the braking operation parameter.

An important aspect to consider is which freezing criterion to select.

In some exemplary embodiments, the freezing criterion requires the maximum temporal gradient that can be achieved by means of the brake pressure pump to be smaller than a gradient of the ideal course. Therefore, if the ideal course varies with time more steeply or with a greater gradient than the brake pressure pump can track the actual value of the braking operation parameter, the freezing criterion is fulfilled.

As already explained, the maximum value in some embodiments may be greater than zero, such that a control error can also be stored or determined via the control operation parameter, i.e., the I component, for example, in that the I component is greater than zero. This ensures that the request value does not become zero and thus the closed-loop controller of the brake pressure pump itself can generate or determine a correspondingly large control error and thus operate the brake pressure pump at a maximum permissible or maximum possible rotational speed. The maximum possible rotational speed also denotes the rotational speed limited in the manner described.

In order to also then set the control operation parameter, i.e., the I component in particular, to the value of greater than zero, for the case in which a fulfilled freezing criterion is identified, the control operation parameter in some embodiments is not frozen or limited immediately, but rather only after a predetermined waiting time. This way, the value of the control operation parameter can also initially increase or grow larger in the presence of a control error.

Until now, the braking moment has been described as the braking operation parameter. Alternatively and in some embodiments, a braking pressure, which can be generated or set by means of the brake pressure pump, or a braking force may be provided as the braking operation parameter. The conversion of different braking operation parameters into one another stems from the fundamental equation of mechanics: F=m·a (force=mass times acceleration).

In order to determine the current maximum achievable temporal gradient of the braking operation parameter, according some embodiments, an elapsed length of time starting at the reception of the braking request is determined and a value of the temporal gradient that is contemporaneous with the relevant current point in time is determined depending on a value of the length of time and on the basis of a model of the braking system. In other words, a temporal variation or temporal increase of the gradient is described by a function or generally by a model as a function of the length of time. This brings the benefit that it is possible to determine the achievable or representable gradient without using sensors.

The model is in some embodiments conceived or configured such that a functional interaction or a functional relationship between the conveyed brake fluid volume and the resulting braking pressure is approximated using a second order polynomial. This results in a calculation rule for the temporal gradient that involves very little calculation effort. Thus, the temporal gradient can also be calculated using a microcontroller that may comprise a single calculation unit. As an alternative to using a model, the braking pressure may also be measured. The conveyed braking volume can be calculated as a function of the length of time and a rotational speed of the brake pressure pump.

As already explained, the ideal course is predefined in order to guide the braking operation parameter from a starting value to the target value. The starting value upon activation of the closed-loop control system is in particular 0, i.e., it can be assumed that the brake cylinders of the braking system are unpressurized. In order to go from the starting value to the target value, care is taken to ensure that the ideal course meets the jerk condition. Said jerk condition in some embodiments requires a jerk produced in the motor vehicle, i.e., the time derivative of the actual acceleration of the motor vehicle, to be smaller than a predetermined maximum value. In other words, the jerk is limited to the maximum value.

Additionally or alternatively and in some embodiments, said jerk condition requires the jerk to be constant. In other words, the value is adjusted upward until the target value is reached if the jerk is constant. Once the target value is reached, the braking request is provided or granted, i.e., the motor vehicle is braked by the requested acceleration value, i.e., −1 m/s$^2$, for example. The ideal temporal course may also be requested by the requester, i.e., by the driver assistance system, in the form of a permissible gradient and thus form part of the request signal of the braking request (target value+gradient).

A braking request of an ACC system can therefore be granted by operating the control device, for example. In other words, said braking request is received from an ACC system in this configuration. In addition or as an alternative to an ACC system, a braking request may also be received in each case from a parking assistance system and/or a braking speed-control system (without distance control) and/or a braking speed-limiter.

According to another aspect, a control device for a braking system of a motor vehicle is provided. The control device comprises a processor apparatus, which is configured to carry out an embodiment of the method according to one or more embodiments of the preceding aspect. The processor apparatus may for example comprise at least one microcontroller and/or at least one microprocessor for this purpose. In order to carry out the method, a program code may be provided which implements or carries out the method when executed by the processor apparatus.

According to another aspect, a motor vehicle comprising a driver assistance system and a braking system is provided. The braking system may for example comprise disk brakes. In the motor vehicle according to the present aspect, the driver assistance system and the braking system are coupled to one another via an embodiment of the control device according to the preceding aspect.

In the following, another exemplary embodiment of the invention is described.

In the exemplary embodiment, the described components of the embodiment represent each individual features that are to be considered independently of each other, and each also develops the invention independently from each other and are therefore to be considered as a part of the invention both individually and in other combinations than the one portrayed. In addition, the described embodiment can also be supplemented by other features than those already described.

Elements having the same functions are, in each case, provided with the same reference numerals in the figures.

FIG. 1 shows a motor vehicle 10, which may be a passenger vehicle or a truck, in particular, for example. A driver assistance system 11, a control device 12, a drive 13 and a braking system 14 are shown.

The driver assistance system 11 may for example be an adaptive cruise control system. The driver assistance system 11 may comprise a closed-loop kinematic controller 15, i.e., a controller for controlling a travel speed or rolling speed in a closed-loop manner, in order to set a travel speed, e.g., for the purpose of distance control. The driver assistance system 11 may output or emit a braking request 16 to the control device 12 in order to adjust a travel speed by means of the closed-loop controller 15.

The control device 12 may for example be a control unit of the motor vehicle 10. The control device 12 may comprise a processor apparatus 17, by means of which a method can be carried out. The control device 12 may comprise a closed-loop controller PI for implementing or actuating the braking system 14, which closed-loop controller can specify a request value 18 for a braking operation parameter of the braking system 14, which request value is then intended to be set by means of a brake pressure pump 19 of the braking system 14. The braking operation parameter may be a braking moment or a braking force or a braking pressure p (pressure for short). FIG. 2 does not show that the control device may also comprise a pilot operation function which can for example immediately generate a desired value on the basis of the equation F=m*a without system deviation, which desired value can then serve as the basis or starting point for the PI controller.

The braking system 14 may comprise an additional, separate closed-loop controller 20 which receives the request value 18 as a desired value and adjusts said value by operating the brake pressure pump 19. The braking system 14 may for example comprise an ESC (electronic stability control) system. The brake pressure pump 19 may be a hydraulic pump.

In order to accelerate the motor vehicle in the event of a corresponding braking request from the driver assistance system 11, the control device 12 can also actuate the drive 13, which, however, is of little importance for the present discussion and is therefore is not described in greater detail here.

FIG. 2 shows how a target value 21 for the braking operation parameter is set by means of the control device 12 depending on the braking request 16. In order to not approach the target value 21 in a jerky or jumpy manner, an ideal course 22 for the braking operation parameter is specified or determined, which ideal course leads from a starting value 23, for example 0, to the target value 21 and thus ensures that the acceleration of the motor vehicle 10 changes with a prescribed jerk, i.e., the ideal course 22 fulfills a prescribed jerk criterion 24.

The control device 12 can then specify the request value 18, and the braking system 14 can track or adjust an actual value 25 of the braking operation parameter using its own closed-loop controller 20 by means of the brake pressure pump 19. For this purpose, the brake pressure pump 19 conveys a volume V of a brake fluid in a known manner into a brake cylinder, which produces an available braking moment 26. Initially, when the brake cylinder is unpressurized, a gradient 27 of the braking operation parameter curve, i.e., of the actual value 25, may be smaller than a temporally corresponding gradient 28 of the ideal course 22.

Accordingly, a control error 29 is produced between the ideal course 22 and the actual value 25. The request value 18 is tracked by means of the closed-loop controller PI depending on this control error 29 and this results in a request value 18 that is greater than the ideal course 22.

Windup 30 would thus be produced if the closed-loop controller 24 allowed the control error 29 to become as large as it would under natural influences. The windup 30 can arise or be stored in a control operation parameter, for example in an I component 31 of the closed-loop controller PI.

In order to prevent excessive windup 30, a maximum value 32 can be specified in the closed-loop controller PI for the control operation parameter, i.e., an I component 31 of the closed-loop controller PI, for example, if it is detected that a freezing criterion 33 has been fulfilled. The freezing criterion may for example require the current gradient 27 to be smaller than the gradient 28.

Therefore, during the closed-loop control task, antiwindup is implemented which limits the closed-loop controller PI if the manipulated variable takes on greater values in absolute terms than can be implemented by the system or, more precisely, the final control element (limitation of the closed-loop controller to the maximum manipulated variable).

If the hydraulic pump or brake pressure pump 19 of the ESC serves as the final control element for a deceleration commanded by the closed-loop kinematic controller 15, the controller 20 is interposed as an additional closed-loop or even open-loop control element, which in turn must create the deceleration requested by the closed-loop dynamic controller PI by building up the braking pressure p. In order to build up the pressure p, a mechanical pump is operated which ultimately does not provide a pressure but rather a volume flow V, which then results in a pressure increase in the braking system 14. Said volume flow V is proportional to the rotational speed of the hydraulic pump in the first approximation and is limited by the permissible rotational speed thereof for technical and acoustic reasons.

FIG. 3 shows how the pressure increase in the hydraulic system of the braking system is, as is well-known, not linear, but rather follows the relevant p-V characteristic curve of the braking system (p=braking pressure, V=volume of the conveyed brake fluid).

On account of this physical relationship, in the case of a dynamically configured closed-loop controller PI, windup 30 toward an excessively large manipulated variable of the closed-loop dynamic controller PI in the form of the request value 18, in particular in the region of low pressure p, is induced not by means of limiting the absolute maximum pressure p, but in a dynamic manner, i.e., by the maximum available pressure gradient 27 at the relevant point in operation or in the relevant operating range of the braking system.

In practice, this means that, whenever the requesting assistance system 11 wishes to set a deceleration with a high gradient 28, the closed-loop dynamic controller PI attempts to correct an apparent control deviation 29 (insufficient deceleration) that is actually caused by the available hydraulic pump 19 not being able to generate the requested pressure p within the expected time by means of volume displacement at its current point in operation (given by pressure p/volume V enclosed in system, permissible rotational speed). However, on account of its integrating behavior, the system will have reached the desired pressure in finite time without the closed-loop controller PI having to change anything relating to the manipulated variable (request value 18). The excessively high manipulated variable requested by the closed-loop dynamic controller PI (excessively large request value 18) must in turn be identified by the closed-loop controller PI by means of control deviation and decreased again. While the manipulated variable is being decreased by means of the closed-loop controller PI, the actual deceleration can increase once more, since the subordinate closed-loop pressure regulator in the braking system still perceives a positive, albeit smaller, control deviation. To complicate matters, the achievable pressure gradient set by the closed-loop pressure regulator also continues to increase with increasing system pressure. On account of the above-mentioned proportionality between the braking pressure and braking moment and thus also deceleration, the deceleration decreases quickly as a result. This produces a very uncomfortable driving situation.

In summary, a conflict of objectives arises in the closed-loop controller concept.

On the one hand, the closed-loop dynamic controller PI should correct control deviations 29 as quickly as possible.

However, on the other hand, the closed-loop dynamic controller PI should not demand greater dynamics (gradient 28) than can be delivered (gradient 27) by its actuator (brake pressure pump 19).

In addition, the dynamics (or time constant) of the actuator are highly variable and do not progress linearly with time (see FIG. 3).

This conflict of objectives is solved in that the closed-loop dynamic controller PI can simultaneously exploit the currently available actuator performance at any time (maximum achievable gradient 27) and yet prevent oscillatory effects and windup at the same time.

For this purpose, the closed-loop controller PI distinguishes between faults it can correct and performance constraints of the actuator at the current point in operation that it is not supposed to correct.

The control device 12 provides the following solution approach for this.

As a reminder, it is noted that, in order to master the described behavior in the closed-loop dynamic controller PI, in one extreme case there is the possibility of configuring the closed-loop controller with regard to the time constants thereof such that said controller never exceeds the braking moment gradient 27 that can be achieved when the hydraulics of the braking system 14 are empty. However, for the brake, depending on its design, this could mean either a significant loss of performance or acoustic disadvantages, because (other extreme case) the permissible pump rotational speed must be increased so far that the highest braking moment gradients 28 required on the system side can also be provided when the system is empty.

An adaptive approach is therefore adopted: Assuming that
a. the pressure-volume relationship (FIG. 3) of the braking system 14 used is metrologically detected at least at measuring points distributed across the relevant pressure region and is therefore known, and
b. the braking force (or braking moment) to pressure ratio as a design criterion for the braking system 14 in ideal conditions is also constant, and
c. assuming a constant maximum permissible pump rotational speed and thus a
known maximum volume flow rate $\dot{V}$ ("V point"),
the available braking moment gradient 27 can be easily approximated as a polynomial function via the current braking pressure p for the purposes of the dynamic series regulator PI. In order to determine the polynomial, the method of the smallest error squares can be used, by means of which method and using the measuring points from point a) the coefficients can be determined such that there is a calculation rule p(V) for.

Derivation produces $$\frac{dp}{dt}$$

and using the known maximum volume flow rate from c), $$\dot{V} = \frac{dV}{dt}$$

i.e., $$\frac{dp}{dV}$$

and thus $\dot{p}(V)$ can be determined.

On the basis of b), it can be assumed that the braking moment generated is proportional to the pressure in the known ratio, i.e., that the braking moment can be obtained by multiplying a time-constant factor by the braking pressure. Said factor remains the same in the derivation, such that there is now a calculation rule for the available braking moment gradient 27; one has:

$$\dot{M}_{BR} = c \cdot \dot{p}(V)$$

This braking moment gradient 27 can now be used to influence the controller dynamics of the close-loop dynamic controller PI.

Alternatively, the model calculation for the available braking moment gradient can be performed offline as opposed to in the software and then entered into the software as a characteristic curve.

1. Depending on the desired behavior and design of the closed-loop dynamic controller PI, said gradient may be converted into an available deceleration gradient using an already existing vehicle model, possibly for pilot operation of the closed-loop dynamic controller, in order to limit the gradient of the request to achievable values at the controller input. This is particularly beneficial in pilot-operated closed-loop controllers and/or if the priority of the requesting assistance system/closed-loop kinematic controller is to never exceed the request gradient (in terms of value).

2. According to another implementation/embodiment, the calculated, maximum available braking moment gradient is compared with the request gradient and, whenever the request features a gradient that is close to or above the calculated maximum gradient, the closed-loop integral controller is frozen or the dynamics thereof are reduced. Said implementation is beneficial if there is no pilot operation of the closed-loop dynamic controller and thus a model-based back-calculation to obtain an acceleration gradient is not possible, or if the priority of the requesting assistance system/closed-loop kinematic controller is to follow the request value at the acceleration or moment level with maximum dynamics and exceeding the requested gradient is permissible. Another benefit of this implementation presents itself in a pilot-controlled system when the actuator, i.e., the ESC or the open-/closed-loop pressure control system thereof adapts its control performance or the acoustics/performance trade-off to the runtime based on the input dynamics. It may then be desirable to apply the open-loop-controlled component of the manipulated variable to the actuator in an unlimited manner and to only limit the closed-loop controller component.

3. In both variants 1 and 2 presented, it would also be expedient to compare the actual pressure [can be converted into a braking moment using b)] already provided by the model calculation with the required braking moment and to also reduce the controller parameter of the closed-loop integral controller (if necessary to "0"), i.e., the so-called I factor or integral factor, which should be differentiated from the value of the closed-loop integral controller (I component) itself, which as described above is/may become a value other than "0", if the actual value exceeds the required value by a prescribed amount, i.e., the maximum value 32 (which may also be "0"). As a result, the I component does not become larger.

4. Depending on the request profile and pressure regulation concept of the actuator, it may be expedient to only limit the controller input gradient according to variant 1 if the determined model braking pressure from 3 falls short of the request by a fixed amount.

5. By means of skilled implementation, it is also possible to reduce the proportional component of the closed-loop dynamic controller if the gradient or amount of the request exceed the model values.

In the following, a mathematical derivation using a second-grade or second-order polynomial and a justification/discussion of the simplifications made is shown.

The control device provides for fade-out by means of the controller integral factor (see point 3 above) whenever the braking pressure resulting from the braking request is not set in the brake or the currently required gradient cannot be delivered by the brake. Therefore Windup of the closed-loop dynamic controller in the brake region can be reduced.

Why is this necessary? The conventional brake, which sets the braking moment (braking moment proportional to pressure in the first approximation), is not in fact a pressure regulator, but a volume flow regulator. The effective parameter is the brake fluid conveyed into the brake by the pump, which brake fluid then creates the pressure which ultimately presses the surfaces of the brake pads and disk against one another and causes a braking effect by means of friction.

Every braking system has a characteristic curve that relates pressure and volume in a system to one another. Said characteristic curve can be measured for a brake. In addition, during the development of the braking, the pump rotational speed permissible for braking requests and the pump geometry can be obtained or the displaced volume per stroke can be directly obtained.

The coefficient with which a desired braking moment in the brake is converted into a pressure can also be obtained from the literature or during the braking development.

As shown in FIG. 3, the braking pressure plotted against the volume has a curve that is parabolic in the first approximation.

For simplification purposes and in order to produce a continuous formula-based relationship (which can also be mathematically derived afterward, since we are primarily interested in the achievable pressure gradient), a quadratic equation is implied:

$$p(v)=av^2+bv+c$$

The coefficients of the equation are then determined using the method of least squares. The quadratic (a) and linear (b) coefficient can be determined. The intercept (c) is always assumed to be "0", which, in light of the orders of magnitude in pressure in regular operation, is a permissible simplification.

The formulas used are then derived. We are looking for the available moment gradient of the brake as a function of the $$\frac{dM_H}{dt}(M_B).$$

braking moment already set. If the required braking moment is tracked with the gradient to be calculated here, the current braking moment can also be easily calculated according to the model at the same time.

Given:
Pressure-volume characteristic curve (p-V characteristic curve) of the brake, thus coefficients a,b of the underlying quadratic equation
Brake pressure-moment relationship: $C_{Brake}$
Geometry of the pump; volume per stroke: $C_{Pump}$
Permissible pump rotational speed: $n_{Pump}$
It is:

$$p(v)=av^2+bv$$

Therefore:

$$v(p) = \pm \frac{1}{2a}\left(\sqrt{4ap+b^2} - b\right)$$

And:

$$\frac{dp}{dv} = 2a \cdot v + b$$

... insert positive v(p) ...

$$\frac{dp}{dv}(p) = \sqrt{4a \cdot p + b^2}$$

The pump parameters can be calculated for the available volume flow rate of the pump; one has:

$$\tilde{V} = \frac{dV}{dt} \approx l_{Pump} \cdot C_{Pump} - p_{Actual} \cdot C_{Leakage}$$

... The leakage is set to "0" to simplify matters ...

$$\frac{dV}{dt} = n_{Pump} \cdot C_{Pump} C_{v,Pump},$$

One has:

$$\frac{dp}{dt} = \frac{dp}{dV} \cdot \frac{dV}{dt}$$

Inserted:

$$\frac{dp}{dt} = \sqrt{4a \cdot p + b^2} \cdot c_{v,Pump}$$

... and with the given pressure-moment relationship $C_{Brake}$ $$\frac{dM_B}{dt} = C_{Brake} \cdot \frac{dp}{dt} = \sqrt{4a \cdot p + b^2} \cdot C_{v,Pump} \cdot C_{Brake}$$

The simplifications made are as follows:
1) The empty run of the brake (distance between brake pad and disk) is not taken into consideration.
   Effects are detected by the closed-loop controller as a disturbance variable
2) Wear effects of the brake are ignored
   The model only considers an ideal brake. In the case of a worn brake, deviations can be detected by the closed-loop controller.
3) Pump leaks are ignored, provided that the linear component thereof is not contained in the specified displaced volume per stroke
4) Temperature/moisture/temperature influences on the friction coefficient of the brake are neglected
5) The closed-loop pressure regulator in the braking system functions optimally, exploits the maximum pump rotational speed, if there is a particular system deviation (which can be parameterized, see adjustable maximum value 32)
6) The start-up speed of the pump should be disregarded (actually in the range of less than 100 ms)
7) Driving dynamics control and slip control are ignored. In this case, the model tends to assume an excessive pressure and the windup is, as is the case today, not addressed. However, in these situations, an, e.g., integrated closed-loop controller can be frozen via the condition of the slip control intervention.

These simplifications can therefore all be made because taking them into account would result in a lower possible gradient than if they were not taken into account.

Alternatively, in the case of driving dynamics control, it is possible to cap the available gradient at "0".

If this information is used to calculate a freezing criterion for the closed-loop controller, the freezing would take place later compared with a concept not involving said simplifications and therefore a certain amount of windup would be allowed to take place. This is of little importance for the following reasons:

1) The available braking pressure gradient increases with the volume conveyed in a non-linear manner. An unattainable pressure gradient is always attainable at some point over the course of the subsequent pressure build-up.
2) In the case where no subsequent pressure build-up should take place (braking request constant), the closed-loop pressure regulator in the ESC will nevertheless continue to exert its control until the requested braking pressure has been reached.
3) In the case where, on account of a pressure model that does not sufficiently account for the state of wear of the hardware, the closed-loop pressure regulator of the ESC cannot correct a static pressure error caused by an unattained gradient, the superordinate closed-loop kinematic acceleration controller will correct said error as an additional control error in the deceleration.

The use of parameters of a worn braking system therefore does not lead to faulty behavior in the closed-loop control chain, but rather merely to a more conservative, earlier freezing of the closed-loop integral controller in dynamic situations, with the sole consequence of a potentially greater static or quasi-static system deviation in said dynamic situation (pilot operation and P component are still active).

In summary, the example shows how a model-based method for dynamically limiting closed-loop controllers to counteract windup can be provided in a closed-loop driving dynamics controller of a motor vehicle by virtue of the invention.

REFERENCE NUMBER LIST

10 Motor vehicle
11 Driver assistance system
12 Control device
13 Drive
14 Braking system
15 Closed-loop kinematic controller
16 Braking request
17 Processor apparatus
18 Request value
19 Brake pressure pump
20 Closed-loop controller
21 Target value
22 Ideal course
23 Starting value
24 Jerk criterion
25 Actual value
26 Available braking moment
27 Gradient of the braking operation parameter
28 Gradient of the ideal course
29 Control error
30 Windup
31 I component
32 Maximum value 33 Freezing criterion
p Braking pressure
PI Closed-loop controller
V Volume The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for operating a control device for a braking system of a motor vehicle, wherein the control device is configured to:
   receive a braking request from a driver assistance system;
   determine a target value of a braking operation parameter of the braking system for said braking request;
   determine an ideal temporal course for said braking operation parameter, which ideal temporal course gradually leads to the target value corresponding to a predetermined jerk condition;
   determine a control error of an actual value of the braking operation parameter in relation to the ideal temporal course and determine a request value for a closed-loop controller of a brake pressure pump of the braking system from said control error on the basis of a closed-loop controller unit; and to
   set the request value in the closed-loop controller; wherein
   the control device is configured to determine a maximum achievable temporal gradient of the braking operation parameter using the brake pressure pump and to check whether the maximum achievable temporal gradient fulfills a predetermined freezing criterion, and, when the freezing criterion is fulfilled, to limit at least one control operation parameter of the closed-loop controller unit and/or a gradient of the braking request to a respectively prescribed maximum value, so that the control device configures the closed-loop controller unit depending on the current capacity of the brake pressure pump with regard to the maximum achievable temporal gradient of the braking operation parameter at the current operating point.

2. The method according to claim 1, wherein the closed-loop controller unit comprises a closed-loop controller having an I component (integral component) and the I component is limited as the at least one control operation parameter.

3. The method according to claim 1, wherein, when the freezing criterion is not fulfilled, the at least one control operation parameter, as a function of the control error, is allowed to become larger than the respectively prescribed maximum value.

4. The method according to claim 1, wherein the freezing criterion requires the maximum achievable temporal gradient to be smaller than a gradient of the ideal temporal course.

5. The method according to claim 1, wherein, after it has been identified that the freezing criterion has been fulfilled, the at least one control operation parameter is limited after a predetermined waiting time.

6. The method according to claim 1, wherein the braking operation parameter is a braking moment or a braking pressure or a braking force.

7. The method according to claim 1, wherein an elapsed length of time starting at the reception of the braking request is determined and for at least one current point in time, a current value of the maximum achievable temporal gradient determined depending on a value of the elapsed length of time and on a basis of a model of the braking system.

8. The method according to claim 7, wherein the model approximates a functional relationship between a conveyed brake fluid volume and a resulting braking pressure using a second order polynomial.

9. The method according to claim 1, wherein the predetermined jerk criterion requires a jerk produced in the motor vehicle to be smaller than a predetermined maximum value when the braking request is set.

10. The method according to claim 1, wherein the jerk criterion requires a jerk produced in the motor vehicle to be constant.

11. The method according to claim 1, wherein the braking request is received from one or more of an adaptive cruise control system, a parking assistance system, a braking speed-control system, and a braking speed-limiter.

12. A control device for a braking system of a motor vehicle, wherein the control device comprises a processor that is configured to:
   receive a braking request from a driver assistance system;
   determine a target value of a braking operation parameter of the braking system for said braking request;
   determine an ideal temporal course for said braking operation parameter, which ideal temporal course gradually leads to the target value corresponding to a predetermined jerk condition;
   determine a control error of an actual value of the braking operation parameter in relation to the ideal temporal course and determine a request value for a closed-loop controller of a brake pressure pump of the braking system from said control error on the basis of a closed-loop controller unit; and to
   set the request value in the closed-loop controller; wherein
   the control device is configured to determine a maximum achievable temporal gradient of the braking operation parameter using the brake pressure pump and to check whether the maximum achievable temporal gradient fulfills a predetermined freezing criterion, and, when the freezing criterion is fulfilled, to limit at least one control operation parameter of the closed-loop controller unit and/or a gradient of the braking request to a respectively prescribed maximum value, so that the control device configures the closed-loop controller unit depending on the current capacity of the brake pressure pump with regard to the maximum achievable temporal gradient of the braking operation parameter at the current operating point.

13. A motor vehicle comprising a driver assistance system and a braking system, wherein the driver assistance system and the braking system are coupled to one another via a control device that is configured to:
   receive a braking request from a driver assistance system;
   determine a target value of a braking operation parameter of the braking system for said braking request;
   determine an ideal temporal course for said braking operation parameter, which ideal temporal course gradually leads to the target value corresponding to a predetermined jerk condition;

determine a control error of an actual value of the braking operation parameter in relation to the ideal temporal course and determine a request value for a closed-loop controller of a brake pressure pump of the braking system from said control error on the basis of a closed-loop controller unit; and to set the request value in the closed-loop controller; wherein the control device is configured to determine a maximum achievable temporal gradient of the braking operation parameter using the brake pressure pump and to check whether the maximum achievable temporal gradient fulfills a predetermined freezing criterion, and, when the freezing criterion is fulfilled, to limit at least one control operation parameter of the closed-loop controller unit and/or a gradient of the braking request to a respectively prescribed maximum value, so that the control device configures the closed-loop controller unit depending on the current capacity of the brake pressure pump with regard to the maximum achievable temporal gradient of the braking operation parameter at the current operating point.

* * * * *